United States Patent
Mauro, Jr.

(10) Patent No.: US 10,062,113 B2
(45) Date of Patent: Aug. 28, 2018

(54) SYSTEM AND METHOD FOR DISPLAYING A VIEW OF MARKET DEPTH ON A GRAPHICAL USER INTERFACE

(71) Applicant: Trading Technologies International, Inc., Chicago, IL (US)

(72) Inventor: Charles Lee Mauro, Jr., New York, NY (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

(21) Appl. No.: 14/264,367

(22) Filed: Apr. 29, 2014

(65) Prior Publication Data

US 2014/0236804 A1    Aug. 21, 2014

Related U.S. Application Data

(63) Continuation of application No. 14/069,635, filed on Nov. 1, 2013, now Pat. No. 8,768,825, which is a continuation of application No. 13/495,585, filed on Jun. 13, 2012, now Pat. No. 8,615,463, which is a continuation of application No. 13/297,503, filed on Nov. 16, 2011, now Pat. No. 8,234,210, which is a continuation of application No. 11/689,789, filed on Mar. 22, 2007, now Pat. No. 8,082,203.

(51) Int. Cl.
*G06Q 40/04* (2012.01)
*G06Q 40/00* (2012.01)
*G06Q 40/06* (2012.01)

(52) U.S. Cl.
CPC .............. *G06Q 40/04* (2013.01); *G06Q 40/00* (2013.01); *G06Q 40/06* (2013.01)

(58) Field of Classification Search
CPC .......... G06Q 40/04; G06Q 40/00; G06Q 40/06
USPC ...................................................... 705/37, 35
See application file for complete search history.

(56) References Cited

U.S. PATENT DOCUMENTS

| | | | |
|---|---|---|---|
| 5,809,483 A * | 9/1998 | Broka et al. .................... | 705/37 |
| 7,664,695 B2 | 2/2010 | Cutler | |
| 7,711,631 B2 | 5/2010 | Singer et al. | |
| 8,082,203 B1 | 12/2011 | Mauro, Jr. | |
| 8,234,210 B2 | 7/2012 | Mauro, Jr. | |
| 8,615,463 B2 | 12/2013 | Mauro, Jr. | |
| 2002/0178105 A1* | 11/2002 | Levine ............................ | 705/37 |

(Continued)

OTHER PUBLICATIONS

"E*Trade Launches E*Trade Pro for Active Traders"[online], Canada NewsWire, Ottawa: Oct. 11, 2001, pp. 1. [Retrieved on Aug. 18, 2011] from the Internet: http://proquest.umi.com/, ProQuest Document ID: 83974544.

(Continued)

*Primary Examiner* — Alexander G Kalinowski
*Assistant Examiner* — John O Preston
(74) *Attorney, Agent, or Firm* — McDonnell Boehnen Hulbert & Berghoff LLP

(57) ABSTRACT

A graphical interface and method are provided for displaying market information corresponding to a tradeable object. According to one example embodiment, a market depth indicator is displayed in relation to a value axis in a market overview interface. Then, detailed market depth is displayed in a market depth interface, and a plurality of market depth prices displayed in the market depth interface are adjustable based on a position of the market depth indicator in relation to the value axis.

13 Claims, 15 Drawing Sheets

(56) References Cited

U.S. PATENT DOCUMENTS

| | | |
|---|---|---|
| 2003/0004853 A1 | 1/2003 | Ram et al. |
| 2003/0065608 A1* | 4/2003 | Cutler ............................ 705/37 |
| 2005/0004852 A1* | 1/2005 | Whitney ........................ 705/35 |
| 2006/0010066 A1* | 1/2006 | Rosenthal et al. ............. 705/37 |
| 2007/0156565 A1 | 7/2007 | Singer et al. |
| 2012/0066110 A1 | 3/2012 | Mauro, Jr. |
| 2012/0253991 A1 | 10/2012 | Mauro, Jr. |
| 2014/0058920 A1 | 2/2014 | Mauro, Jr. |

OTHER PUBLICATIONS

"HyperFeed is Market Data Provider to Charles Schwab's StreetSmart Pro and Velocity Trading Software"[online], PR Newswire,New York: Aug. 22, 2001, pp. 1. [Retrieved on Aug. 18, 2011] from the Internet: http://proquest.umi.com/, ProQuest Document ID: 78368837.

"Schwab to Expand Active Trader Offering with 'Direct Access' Trading Technology" [online], 000485PR Newswire, New York: Mar. 8, 2001, pp. 1. [Retrieved on Aug. 18, 2011] from the Internet: http://proquest.umi.com/, ProQuest Document ID: 69332449.

\* cited by examiner

| Market Data 302 | | | | | | | | |
|---|---|---|---|---|---|---|---|---|
| Scan | T. O. | BidQty | BidP | AskP | AskQty | WrkSell | NetPs | LastP | LastQ |
| | FGBL Sep06 | 797 | 49825 | 49800 | 125 | | | 49850 | 134 |
| | FGBM Sep06 | 1025 | 112.52 | 112.53 | 682 | | | 112.52 | 50 |
| | FGBS Sep06 | | | | | | | 105.09 | 1 |
| | ES Sep06 | 27 | 82650 | 82675 | 139 | | | 82650 | 9 |
| | FDAX Sep06 | | | | | | | | |
| | FESX Sep06 | | | | | | | | |
| | NQ Sep06 | 279 | 98800 | 98850 | 16 | | | 98850 | 26 |
| 306 | 308 | 312 | 314 | 316 | 318 | 320 | 322 | 324 | 326 |

FGBL Sep06 — 304

| | 45 | | | |
|---|---|---|---|---|
| | | 885 | 50025 | |
| | | 265 | 50000 | |
| | | 418 | 49975 | |
| | | 359 | 49950 | |
| | | 292 | 49925 | |
| | | 533 | 49900 | |
| | | 527 | 49875 | |
| | 130 | 917 | 49850 | |
| | | 797 | 49825 | |
| 49800 | 125 | | | |
| 49775 | 200 | | | |
| 49750 | 245 | | | |
| 49725 | 645 | 100 | | |
| 49700 | 150 | | | |
| 49675 | 100 | | | |
| 49650 | 550 | | | |

310 — Automatic cycle of data — 328
330 — Set up automatic cycle
332 — Custom cycle routines
300

SYSTEM AND METHOD FOR DISPLAYING A VIEW OF MARKET DEPTH ON A GRAPHICAL USER INTERFACE

CROSS REFERENCE TO RELATED APPLICATIONS

This application is a continuation of U.S. patent application Ser. No. 14/069,635, filed Nov. 1, 2013, now U.S. Pat. No. 8,765,825, which is a continuation of U.S. patent application Ser. No. 13/495,585, filed Jun. 13, 2012, now U.S. Pat. No. 8,615,463, which is a continuation of U.S. patent application Ser. No. 13/297,503, filed Nov. 16, 2011, now U.S. Pat. No. 8,234,210, which is a continuation of U.S. patent application Ser. No. 11/689,789, filed Mar. 22, 2007, now U.S. Pat. No. 8,082,203, entitled "System and Method for Displaying a View of Market Depth on a Graphical User Interface," the contents of each of which are fully incorporated herein by reference for all purposes.

TECHNICAL FIELD

The present invention is directed to electronic trading. More specifically, the present invention is directed towards a system and method for trading interfaces in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions.

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains uninterrupted contact to the client devices and possibly other trading-related systems.

Using client devices, traders link to the host exchange through one or more networks to trade tradeable objects. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

A client device is a computer such as a personal computer, laptop computer, hand-held computer, cell phone, personal digital assistant ("PDA"), or some other screen-based user interaction device that has network access. A network is a group of two or more computers or devices linked together in any fashion, which may be characterized by topology, protocol, and architecture. For example, some market participants may link to the host through a direct network connection such as a T1 or ISDN. Some participants may link to the host exchange through direct network connections and through other common network components such as high-speed servers, routers, and gateways that allow a trader to connect to an electronic exchange. The Internet, a well-known collection of networks and gateways, can be used to establish a connection between the client device and the host exchange. There are many different types of wired and wireless networks and combinations of network types known in the art that can link traders to the host exchange.

Sometimes, on their machines, traders use automated or semi-automated trading tools, collectively hereinafter referred to as automated tools, that automatically or semi-automatically send orders for tradeable objects to the exchange. Many different trading tools are usually provided to, among other things, facilitate fast and accurate order entry. For instance, an automated or semi-automated tool might quickly calculate one or more order parameters, such as order price or order quantity, based on market conditions, or some other reference condition, and then automatically send an order with these parameters to an exchange for matching.

In addition to trading individual tradeable objects, many traders are involved in executing trading strategies that require constant tracking of a large number of individual tradeable objects. Such traders often view the status and market conditions of each tradeable object of interest on individual graphical interfaces that are used for trading each tradeable object. Typical trading interfaces present the status of each tradeable object in a line of numeric data fields covering key variables relevant to trading, such as price, quantity available at each price, the level of inside market, and others. The use of multiple interfaces of this type may be burdensome to a trader who needs to accurately and fast view critical changes in the market conditions of a large number of tradeable objects. More specifically, using a large number of user interfaces or display screens that take up too much space on a trader's screen and don't provide easily detectable changes in market conditions corresponding to the tradeable objects may require high levels of visual scanning and extensive mental numeric calculations on a real time basis. Additionally, when a trader uses a plurality of interfaces to execute trading strategies based on a large number of tradeable objects, it may be difficult and time consuming to monitor status and relative positions of working orders and net positions for each tradeable object.

While many trading platforms allow a trader to enter orders directly through a trading interface, some traders may still enter orders through an interaction with a pre-coded order entry window, often referred to as an "order entry ticket." These individual interface screens are generally hard-coded in standard interface configurations and can only be manipulated to the extent that the underlying window control functions only allow basic functions, such as simple resizing of the "order entry ticket." While a trader could configure individual settings within an order entry ticket, such as a default price or quantity, the trader has no control related to the overall physical layout of the major controls of the order entry ticket itself.

To profit in electronic markets, market participants must be able to assimilate large amounts of data in order to recognize market trends, view current market conditions, and quickly enter, cancel, update, and modify orders. Thus, it is desirable to offer tools and trading interfaces that can assist a trader in trading in electronic trading environments, and are flexible enough to meet different traders' trading objectives as well as their individual trading styles.

BRIEF DESCRIPTION OF THE DRAWINGS

Example embodiments are described herein with reference to the following drawings, in which:

FIG. 3 is a block diagram illustrating a combination of a market depth interface and a second interface for selecting a tradeable object for which the trader wishes to view detailed market conditions via the market depth interface;

FIG. 4 is a block diagram illustrating an example display of multiple market depth interfaces for a plurality of tradeable objects;

FIGS. 7A-7E illustrate a plurality of depth interfaces with various levels of market depth information;

FIG. 9 is a block diagram illustrating a plurality of depth interfaces with accompanying change order and open order interfaces;

FIG. 12 is a block diagram illustrating a plurality of order entry tickets; and

DETAILED DESCRIPTION

I. Overview

Example systems and associated methods described below provide a trading interface and trading tools that provide a trader with a system which can be configured to reduce the amount of cognitive workload required to monitor and make trades in tradeable objects.

According to one example method, a market depth indicator is displayed in relation to a first value axis using a first value scale in a market overview interface. In one embodiment, the market depth indicator corresponds to a plurality of market depth prices for the tradeable object. The method further includes displaying a market depth interface in relation to the market overview interface, where the market depth interface displays the plurality of market depth prices and a plurality of areas for displaying at least a bid quantity indicator at a highest bid price and an ask indicator at a lowest ask price in relation to a second value axis. According to the example embodiment, the plurality of market depth prices displayed in the market depth interface are adjustable based on a position of the market depth indicator in relation to the first value axis. Upon moving the market depth indicator to a new location in relation to the first value axis such that the market depth indicator corresponds to a new plurality of market depth prices, the market depth interface is dynamically modified by adjusting the plurality of market depth prices to display the new plurality of market depth prices with corresponding bid and ask quantities available for the tradeable object at the electronic exchange.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. A First Example Trading System

Figure 1:
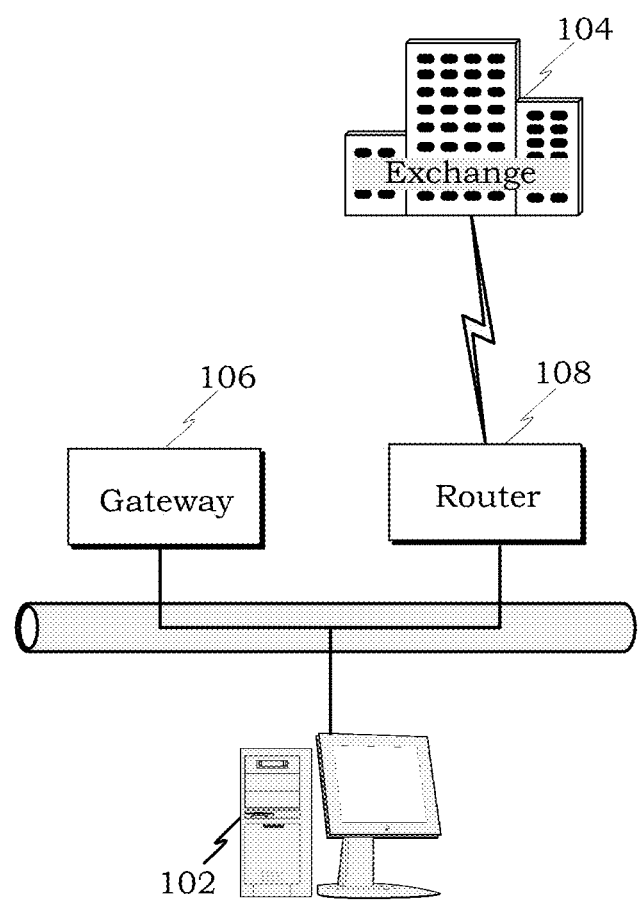
FIG. 1 illustrates a trading system for electronic trading according to an example embodiment, wherein the trading system includes a trading station where a trader can submit bids and offers for a tradeable object being traded at an electronic exchange.

FIG. 1 illustrates an example electronic trading system in which the example embodiments may be employed. In this example, the system comprises a trading station 102 that accesses an electronic exchange 104 through a gateway 106 via wireless, wired, or the combination of the wired and wireless connections. Router 108 is used to route messages between the gateway 106 and the electronic exchange 104. The electronic exchange 104 includes a computer process (e.g., the central computer) that matches buy and sell orders sent from the trading station 102 with orders from other trading stations (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the type of order execution algorithm used, the electronic exchange 104 provides market information to the subscribing trading station 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), order fill information, different order types, contra party identity data, firm identity data, and general market conditions, such as overall index values and exchange trend data.

The computer or some other device with a user interface employed as the trading station 102 generally can range from a laptop, personal computer, or hand-held device, such as a PDA or a cell phone, to a larger computer such as a workstation and multiprocessor. An illustrative personal computer may use Pentium™ microprocessors and may operate under a Windows operating system, or yet may use some other microprocessor or operating system. Generally, the trading station 102 includes a monitor (or any other visual display type output device) and an input device, such as a keyboard and/or a two or three-button mouse, a touch panel, a 3D mouse, or a pen-input to support user initiated trading, if so desired. Input modules may also include speech activated selection processes that convert hardware or software input device commands to machine executable actions. It should be understood that the trading station 102 can include any screen-based display modality to embody the visual display of tradeable information. It should be understood that the displays could also include projections on surfaces or other objects. One skilled in the art of computer systems will understand that the present example embodiments are not limited to any particular class or model of computer employed for the trading station 102 and will be able to select an appropriate system.

The computer employed as the gateway 106 generally can range from a personal computer to a larger computer. An illustrative gateway 106 computer may use Pentium™ microprocessors and may operate under a Windows (server or workstation) operating system, or yet some other system. Generally, the gateway 106 may additionally include a monitor/display device (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a trading station or a gateway generally includes a central processing unit, a memory (a primary and/or secondary memory unit), an input interface for receiving data from a communications network, an input interface for receiving input signals from one or more input devices (for example, a keyboard, mouse, voice activation, etc.), and an output interface for communications with an output device (for example, a monitor). A system bus or an equivalent system may provide communications between these various elements.

It should also be noted that the trading station 102 generally executes application programs resident at the trading station 102 under the control of the operating system of the trading station 102. Also, the gateway 106 executes application programs resident at the gateway 106 under the control of the operating system of the gateway 106. In other embodiments and as understood by a person skilled in the art, the function of the application programs at the trading station 102 may be performed by the gateway 106, and likewise, the function of the application programs at the gateway 106 may be performed by the trading station 102. Alternatively, it should be understood that the trading station 102 and the gateway 106 could also use other operating systems, such as Internet or web operating systems or web-based operating systems.

The actual electronic trading system configurations are numerous, and a person skilled in the art of electronic trading systems engineering would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

According to another example embodiment, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN.

In yet another example illustration, the gateway may be housed at, or near, its corresponding electronic exchange. According to this instance, the trading station may communicate with the gateway over a wide area network or through the use of a T1, T3, ISDN, or some other high speed connection.

In another example illustration, the gateway may be located remote from the trading station and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

III. A Second Example Trading System

Figure 2:
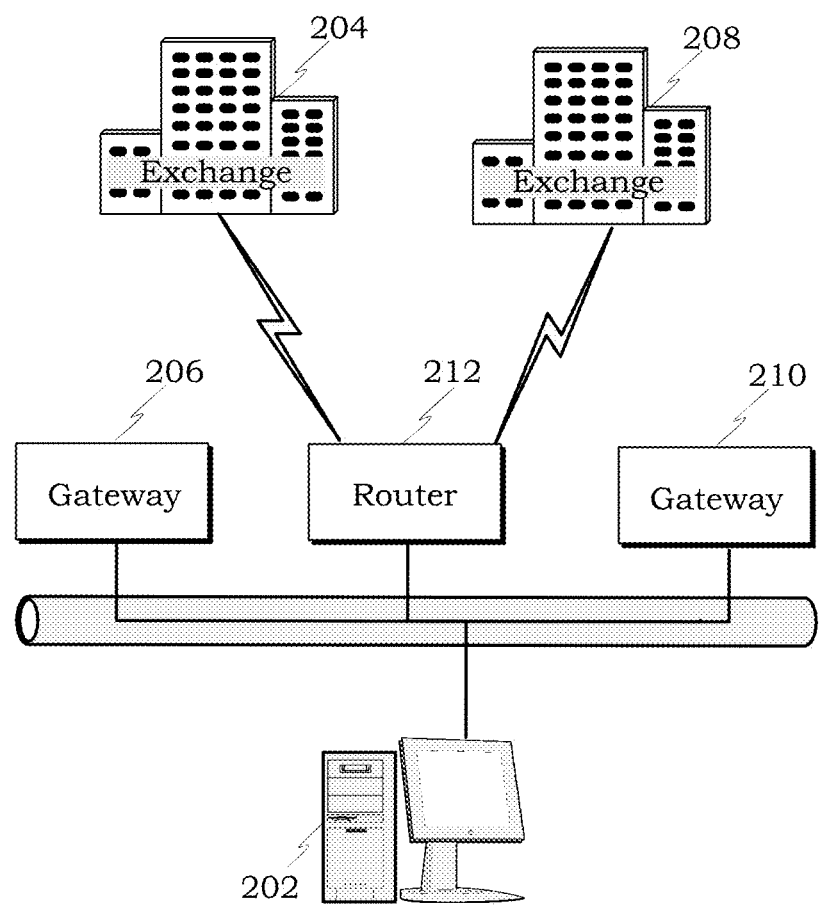
FIG. 2 illustrates another trading system for electronic trading according to another example embodiment, wherein the trading system includes a trading station where a trader can submit bids and offers for a tradeable object being traded at more than one electronic exchange.

FIG. 2 illustrates another example trading system that uses similar computer elements as shown in FIG. 1, in which, the example embodiments may be employed to trade at multiple electronic exchanges. The system comprises a trading station 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired, using the trading interface and displays described hereinafter.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can trade a trading strategy, such as a spread, using different tradeable objects listed at different electronic exchanges. A spread generally includes buying at least one tradeable object and, usually at the same time, selling at least one different tradeable object in an effort to reduce the trader's downside risk of trading a tradeable object.

As indicated earlier, one skilled in the art of electronic trading systems engineering will understand that the present embodiments are not limited to the particular configurations illustrated and described with respect to FIG. 1 and FIG. 2, and will be able to design a particular system based on the specific requirements (for example, by adding additional exchanges, gateways, trading stations, routers, or other computers serving various functions like message handling and security). Additionally, several networks, like either of the networks shown in FIG. 1 or FIG. 2, may be linked together to communicatively access one or more electronic exchanges.

IV. Graphical User Interfaces

The example embodiments described below include trading interfaces that allow a trader to gain a fast, accurate, and comprehensive view of the current market conditions for a large number of tradeable objects. The embodiments also describe a new method and interface that allows a trader to better visualize the status and modify parameters of a large number of orders corresponding to a plurality of tradeable objects.

In addition to the trading interfaces, which display the market data of tradeable objects in a form that reduces the cognitive workload of a trader and allow for the accurate and rapid tracking of many tradeable objects, the example embodiments described below also include a new order entry/order change ticket. The example order entry/change ticket allows a trader to control the overall physical layout of its components thereby making it possible to create order entry controls that can be highly tailored to traders' specific trading style and needs. The user-configurable order entry/ order change ticket and scaleable depth display allows a trader to create customized layouts that are more closely aligned with the trader's individual trading style, the embodiments of which will be described in greater detail below.

A. Market Depth Interfaces

FIG. 3 is a block diagram illustrating an example interface 300 that provides limited market data for a large number of tradeable object and allows a trader to selectively and quickly view more detailed market information for a desired tradeable object.

The interface 300 includes a depth gauge interface 304 and a market view interface 302. The market view interface 302 displays limited market information for a number of tradeable objects. More specifically, the market interface 302 includes a "Name" column 308 that displays names of tradeable objects selected by a trader, such as "FGBL-TT Sep06," and others shown in FIG. 3. Other columns of the market interface 302 include working buys ("WrkBuys") 310, bid quantity ("BidQty") 312, bid price ("BidPrc") 314, ask price ("AskPrc") 316, ask quantity ("AskQty") 318, working sells ("WrkSells") 320, net position ("NetPos") 322, last traded price ("LastPrc") 324, last traded quantity ("LastQty") 326. For example, in relation to the first tradeable object "FGBL-TT Sep06," a trader has no working buy quantity or sell quantity as shown at 310 and 320, the bid quantity of 797 is pending at the best bid price of 49825, the ask quantity of 125 is pending at the best ask price of 49800, and the last traded quantity of 134 was traded at the last traded price of 49850.

While the market view interface 302 displays only a selected number of parameters related to the tradeable object, a user could obtain a more detailed look at market conditions of a selected tradeable object via the depth gauge interface 304. According to one example embodiment, a user could move a cursor or yet some other screen icon of a user input device in a scan region 306 of the market view interface 302 to scan a series of tradeable objects and obtain a rapidly viewable detailed look at price and quantity data for a tradeable object via the depth gauge interface 304.

According to one example embodiment, upon detecting a predefined movement of an icon or some other indicator corresponding to a user input device between the cells displayed in the column 306, the market interface 302 could automatically display detailed market conditions for different tradeable objects upon detecting different locations of a cursor in relation to tradeable object identifiers displayed in a tradeable object ("T.O.") column 308. Such a configuration allows a trader to quickly and selectively view more detailed market conditions corresponding to the tradeable objects in the market window 302, and the application of the predefined movement in the column 306 prevents from accidental switching of what is displayed in the market window 302 and allows for recognition of intentional vs. unintentional requests for a change. It should be understood that the predefined movement that triggers changes in the market interface 302 could be defined based on a number of parameters. According to one example embodiment, the parameters could be based on a directional movement, a speed of movement, or the combination thereof. For example, if a user input device is moved up and down in the column 306, different tradeable objects are selected. However, if the movement is left or right or at some other angles, no changes to the selected tradeable object would be made. Additionally, if a user input device is moved too fast, no changes in the selection of the tradeable object may occur. In addition to the speed of movement and directional movement, a change in the selected tradeable object may occur upon detecting that a user input device hovers over an indicator corresponding to a tradeable object in the column 306 irrespective of at what speed the user input device was placed at the indicator.

According to one example embodiment, an order ticket, such as the one illustrated in relation to later figures could be displayed in relation to the interface 302, so that when a user moves a cursor in the scan column 306, the data displayed in the order ticket may dynamically change as well to correspond to the currently selected tradeable object. For example, depending on an order ticket configuration, the order ticket could dynamically display an inside market price currently available for the tradeable object, a default quantity preset for the tradeable object by a user, and other parameters specified for the tradeable object, such as order types available for trading the tradeable object. Such an embodiment may be very useful as a user can quickly enter orders for a number of tradeable objects using preconfigured order tickets for each tradeable object.

It should be understood that more than one depth interface, such as the interface 304, could be displayed simultaneously in relation to the market interface 302. To do that, in an embodiment where a trader uses a mouse as a user input device, the trader could first double-click on the first selected tradeable object to create a permanent window for that tradeable object, and then move the mouse in the "Scan" column 306 to activate a new depth interface. The new depth gauge interface could be displayed in relation to the depth gauge interface 304, such as at the top, or on the side of the interface 304, based on the user's configuration. A trader could use the same method to display additional depth interfaces. It should be understood that different methods could also be used to create additional depth gauge interfaces. For example, a user could create a new depth gauge interface by selecting a scan cell in the "Scan" column 306 corresponding to a desired tradeable object and dragging the selected cell to any area outside the market view interface 302. In such an embodiment, the release of the click and drag sequence may result in the display of a new depth gauge interface at a new location on the screen.

It should be understood that rather than displaying a different view of market data every time a cursor is moved up and down in the scan region 306 between levels corresponding to different tradeable objects, the depth gauge interface 304 could display market data corresponding to a selected tradeable object regardless of the position of the cursor in the region 306 relative to the tradeable object indicators. According to one example embodiment, a user could select a desired tradeable object for which the user wishes to view the detailed market information via the interface 304 by double clicking on a desired tradeable object identifier in the T.O. column 308. Also, it should be understood that multiple depth gauge interfaces could be displayed in relation to the market view interface 302. According to one example embodiment, to create a new instance of a depth gauge interface, a user could move a cursor in the scan region 306 relative to the tradeable object indicators to activate a new depth gauge interface.

It should be understood that a user could modify the width and height of the scan region 306 as well as other columns that will be described below by modification of the overall size of the window corresponding to the market view interface 302 or by selection of a width control for each column. The ability to reduce or enlarge the size of the columns, especially of the scan column 306, allows for greater control of the area to be detected by the system to bring forth a depth gauge display for the tradeable objects.

The example embodiment illustrated in FIG. 3 also provides an automatic cycle feature which automatically cycles through the tradeable objects displayed in the market view interface 302 based on a user-defined cycle time. A user could activate or deactivate the automatic cycle mechanism by selecting an "automatic cycle of data" tab 328. Such an embodiment allows a trader to receive visual presentation of detailed market data via the depth gauge interface 304 for each tradeable object without specific interaction via the scan column 306. It should be understood that automatic cycle display times can be set for all or any combination of tradeable objects shown in the display by the selection of a "Set-up Automatic cycle" tab 330 that may activate one or more user interfaces for setting up a desired cycle.

In addition to being able to set automatic display cycles, a user could also set one or more depth gauge interfaces to present data from tradeable objects selected based on some other preset variables. For example, the preset variable for selection of tradeable objects could include "most active market," "highest volume," "greatest move since open," "greatest change over a set period of time," and many others. It should be understood that a combination of variables could be used as well. Additionally, a user could use the automatic display functions to create relationships between tradeable objects that result in the cycled display of depth gauge interfaces that could present market conditions of certain tradeable objects. The relationships between the tradeable objects could be created using Boolean operators, such as "AND," "OR," or "NOT" functions, or using some other configuration methods. These additional cycle related functions can be associated with a "Custom cycle routines" button 332. The automatic custom routines may be very useful to a trader as they relieve the trader from constantly monitoring the display for critical changes in market conditions for a large number of tradeable objects.

Figure 4:
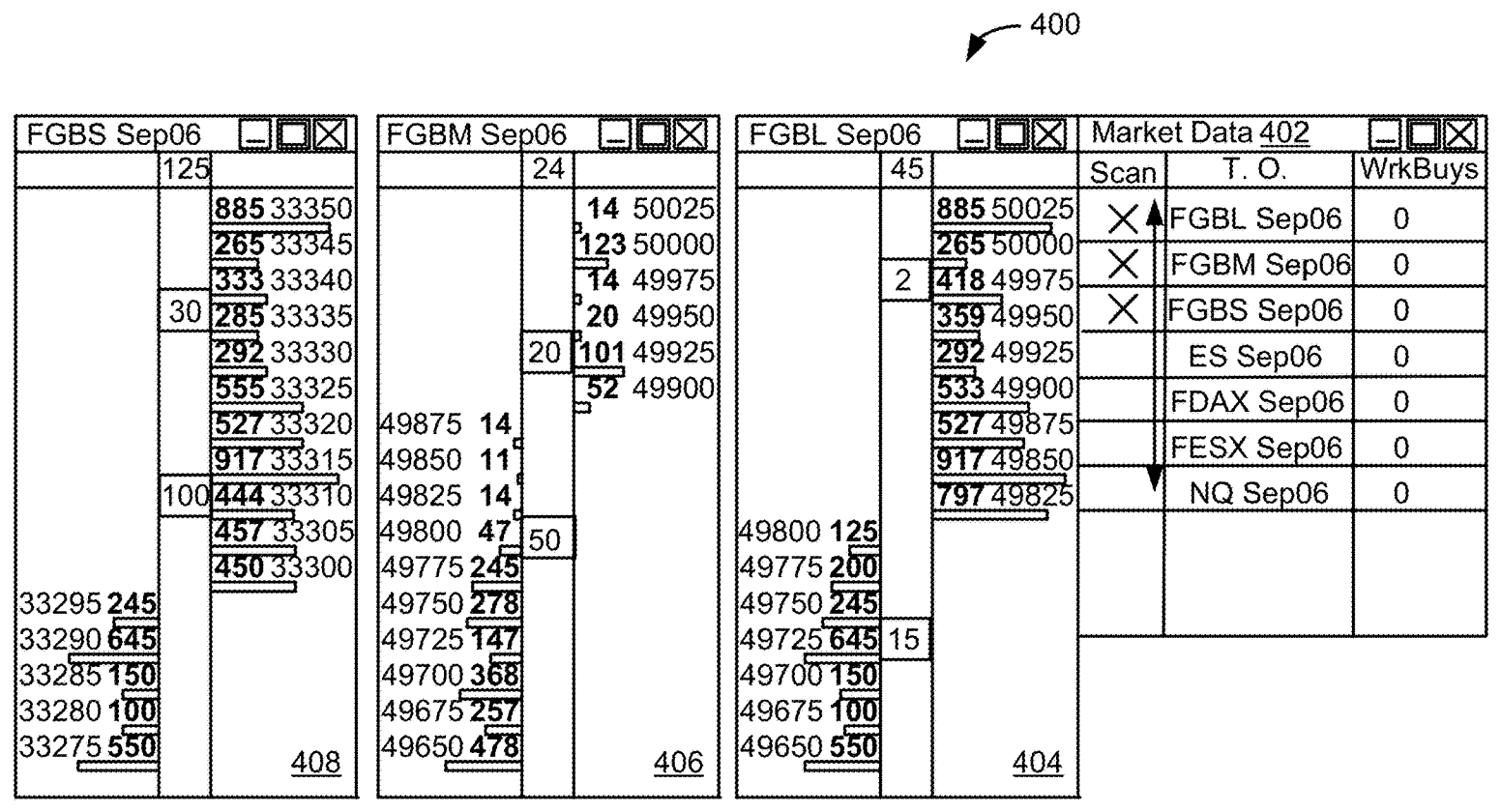

FIG. 4 is a block diagram 400 illustrating a plurality of simultaneously displayed depth gauge interfaces that display market data corresponding to a plurality of tradeable objects. The block diagram 400 illustrates a section of a market view interface 402, the features of which were described in FIG. 3, and three depth gauge interfaces 404, 406, and 408. The depth interfaces 404-408 display market data corresponding to the three top tradeable objects that were selected from the market view interface 402. It should be understood the depth gauge interfaces could be stacked in any combination of positions on the traders' screen so that the data displayed via the depth gauge interfaces remain in full view. In the illustrated embodiment, as the tradeable objects are preselected via the market view interface 402, there is no need for a user to interact with the market view interface 402 to switch between the markets displayed via a single depth gauge interface. Thus, such a configuration decreases the amount of cognitive effort required on the part of a trader and enables the trader to concentrate on trading and monitoring the selected markets. It should be understood that each depth gauge interface illustrated in FIG. 4 can be resized to either increase or reduce the amount of information displayed via each interface. Also, a series of set up parameters could be used to either fix the amount of information displayed on an interface or to enable changes in the amount of data displayed based on the size of the interface. In the fixed mode of the operation, the extent of data displayed in a depth gauge interface may be set to not change but rather may be visually cut off as the size of the interface is decreased. In the second mode, the system may automatically eliminate data from the interface until the interface displays the smallest preset view. It should be understood that different configurations are possible as well. Also, based on the number of tradeable objects selected in the market interface 402, more than three depth gauge interfaces could be displayed as well.

Figure 5:
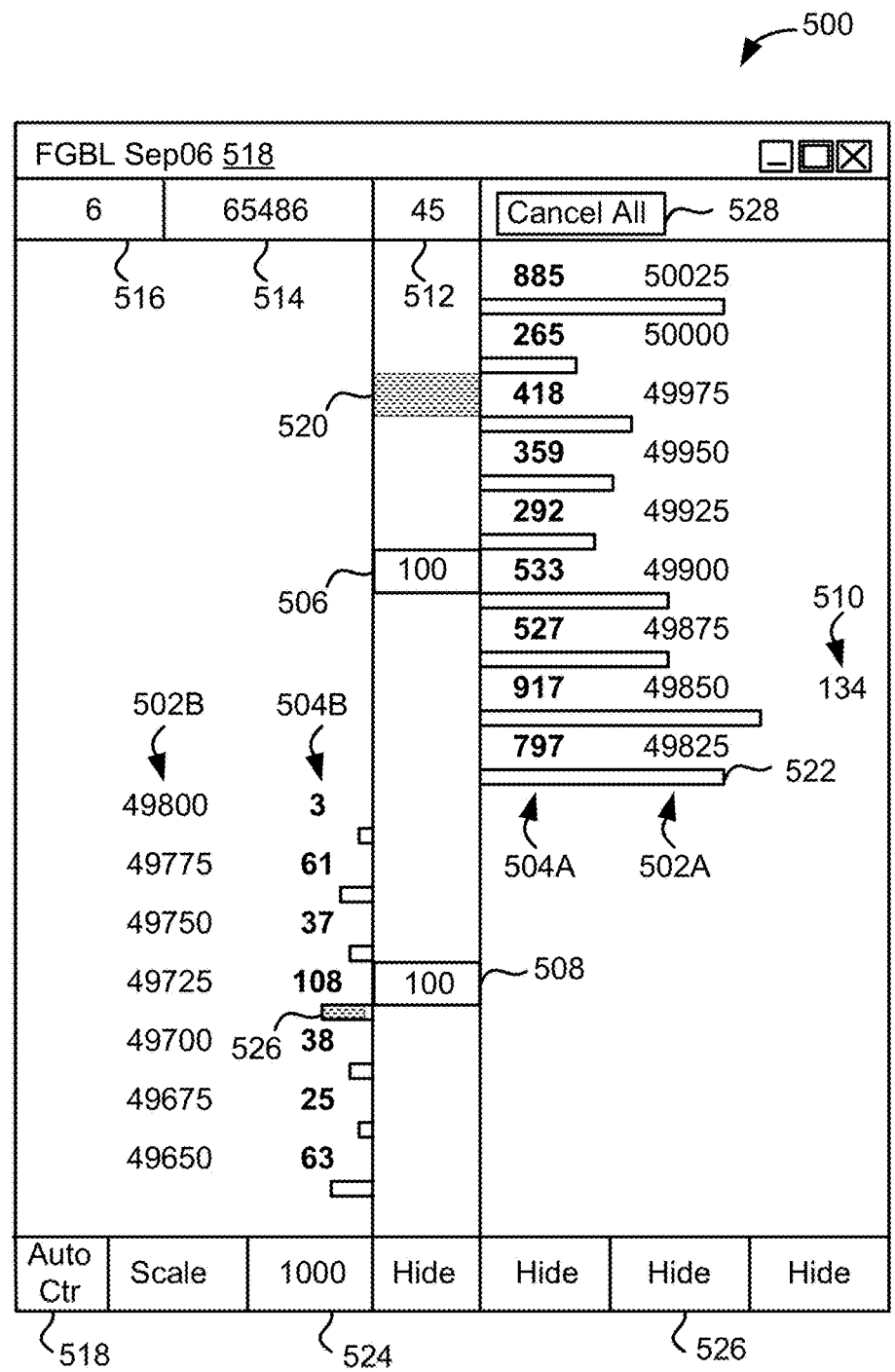
FIG. 5 is a block diagram illustrating one example embodiment of a depth interface that displays market data and trader-related information for a tradeable object.

FIG. 5 is a block diagram illustrating one example embodiment of a depth gauge interface 500 that displays market data and trader-related information for a tradeable object. The market data in the depth gauge interface 500 is displayed in relation to a number of columns; however, it should be understood that different layouts are possible as well. For example, rather than displaying price information vertically, the prices could be displayed horizontally or at some other user-defined angle. Additionally, any user defined shapes or colors could be used to represent various data or indicators that are displayed via the interface 500.

The depth gauge interface 500 displays market depth corresponding to a tradeable object by displaying price levels and quantities corresponding to each price level as shown at 502A and 504A, for the ask side of the market, and 502B and 504B for the bid side of the market. While the price columns for each bid and ask side of the market form two separate columns, it should be understood that one continuous column displaying both ask and bid prices, or yet different layouts could be used as well. Also, as mentioned earlier, while the depth gauge interface 500 displays price values, a derivative of the price, or yet some other values could be used. It should be understood that a trader could enlarge the interface 500 in a vertical direction thereby causing the interface to display additional price values and additional market information corresponding to the additional prices.

As shown in FIG. 5, the current market conditions correspond to the best bid quantity of 3 at the price of 49800 and the best ask quantity of 797 at 49825. According to an example embodiment, these as well as other market depth levels corresponding to a tradeable object are dynamically updated based on market updates that are received from an electronic exchange so that the depth gauge window 500 can display current market conditions for a specific tradeable object. In addition to numerical values corresponding to the currently available quantities, the depth window may also provide a graphical representation of a quantity value at each price level, as shown using bars at each price level, such as a bar 522 representing a current quantity at the best ask. In the embodiment illustrated in FIG. 5, the length of each bar is determined based on a user-defined scale, with the maximum length of the bar corresponding to a quantity of 1000, as shown in a scale indicator field 524. The graphical indicators of the quantity values at each price level allow a trader to quickly assess and compare a quantity available at one price relative to a plurality of other prices. It should be understood that as one of the quantities exceeds a maximum quantity defined for the scale, e.g., when the bar reaches its maximum length such that it extends all the way to the side of the display, a visual indicator could be provided to alert the user that the quantity at the corresponding price exceeds the maximum value set up for the scale. For example, the edge of the bar that touches the side of the display could be highlighted to provide a visual indicator to a user. However, it should be understood that different indicators could also be used. Additionally, a user could change the scale to be used in relation to the quantity bars, and the bars could be rescaled.

In the embodiment shown in FIG. 5, the center column may be used to display a number of user-defined indicators. The user-defined indicators could be based on market data corresponding to a tradeable object, order data, or theoretical values provided from the trading application or an external application. Indicators 506 and 508 display trader's working orders at prices 49900 and 49725, respectively. As shown in relation to the indicators 506 and 508, a row corresponding to the price level of the trader's working order may be highlighted so that the trader can easily spot his working orders. In addition to displaying a quantity and an indicator associated with each trader's working order in the center column of the depth window 500, the bar indicators at each price level could be color-coded to show how much of the overall quantity at each price level corresponds to the trader's working orders. One example depiction of the trader's quantity in relation to a bar at 49725 is shown at 526, where the trader's working order makes up 100 of the overall quantity of 108 at that price level.

The center column can also be used to display any other user-defined indicators. For example, an indicator 520 displays a target price level set by a user based on any user-defined formula. When the market reaches the designated price, or yet some other condition is satisfied in relation to the designated price, the indicator 520 could start flashing or yet some other alert could be provided as well. The interface also displays a last traded quantity/price indicator at 510. As shown in FIG. 5, the indicator 510 is located at the level of the last traded price, here 49850, and a numerical value corresponding to the last traded quantity is displayed in relation to the indicator. According to one example embodiment, when a new last traded quantity/price is detected, the indicator could start flashing or yet some other alerting method could be used. Also, while the indicator 510 corresponds to the last traded quantity/price on the sell side of the market, it should be understood that a similar indicator could also be displayed on a buy side of the market, here, to the left of the bid quantity indicators if the last traded price corresponds to a price on the buy side. It should be understood that different indicator types or different locations for displaying the last traded price indicator could also be used.

The top portion of the depth interface 500 provides a full description of a tradeable object corresponding to market data displayed in the window 500, as shown at 518. It also defines a net change between the current market level and a predefined market level, such as a net change since the last update, here "6" shown at 516, the total traded volume at 514, and a trader's net position at 512. Also, the bottom portion of the interface includes a number of features that allow a trader to control the layout of the interface. For example, a centering field 518 allows a trader to control a mode of centering of the interface, such as, auto-center, shown here, which would automatically re-center the view of market data upon detecting a certain condition. Finally, "Hide" icons, generally indicated as 526, are shown on the bottom of the interface. The "Hide" icons allow a trader to control the overall view of the interface by effectively eliminating certain features of the interface, the embodiments of which will be described in greater detail below. For example, by selecting a "Hide" icon below the center column, a trader could hide any indicators displayed in the center column.

A trader could also enter and modify orders using the depth window 500. According to one example embodiment, a trader could place an order using different order entry methods. According to the first order entry method, a trader could enter an order having a preset order quantity by selecting a desired price. The selection of a price can include one or more user inputs, such as one or more clicks with a mouse or some other input device, within a region corresponding to a desired price, or a combination of a single/double click and selection of a key on a keyboard. Additionally, when a mouse is used as a user input device, a buy order could be initiated by selecting a desired price level with a left-click, and a sell order could be initiated by selecting a desired price level with a right-click. Those skilled in the art will understand that different variations are possible as well.

It should be understood that an order entry region corresponding to a price can be established as an area associated with a price, such that any location within the specified area corresponding to the price. In such an embodiment, a user could enter a buy order by selecting an area aligned with a price in a bid region. Similarly, a sell order could be placed by selecting an area aligned with a price in an ask region. For example, using the interface shown in FIG. 5, a trader could enter a buy order at a price of '49775' by clicking on a location where the price is displayed in the bid column 502B. Alternatively, a trader could select a location corresponding to the price of "49775" in the quantity column 504B, here the location that displays the quantity of "61." It should be understood that the step of selecting any other location aligned with the price level of "49775" could activate placement of an order as well. Further, it should be understood that the region corresponding to the desired price could be either aligned with the price level or any other configuration could be used as well, such as positioning the region at some preset angle with respect to the price level.

According to the example embodiment described above, an order is sent to an electronic exchange when a trader selects a desired price level. However, an order ticket could be used in addition to or as an alternative to the order entry method described above. According to one example embodiment, an order entry ticket could be used as a confirmation window that a trader could use to confirm or change order parameters before the order is sent to an electronic exchange. Alternatively, rather than selecting a price for an order via the interface 500, an order entry ticket could be used to preset order parameters, such as an order price, an order quantity, and an order type, and to send the order to an electronic exchange.

A trader could also view and modify parameters associated with pending working orders by selecting a desired working order indicator in the center column. Similarly, a trader could quickly delete a working order by selecting a working order indicator. According to one example, a single click on the working order indicator could activate modification of the order, while a double click could delete the working order. However, different embodiments are possible as well. Also, if there is more than one order at the selected working quantity indicator, a change window with a list of working orders could be displayed so that a trader can select a desired order.

The depth interface 500 could also allow a trader to move working order indicators to different price levels. For example, if there is a single order that corresponds to a working order indicator, a trader could simply select the indicator and move it to a new price level. In such an embodiment, a new order at a new price level could automatically replace the old order, or, alternatively, a confirmation window could be displayed before any action is taken. Also, a trader could consolidate multiple orders into one price by moving multiple working order indicators to a desired price level. Upon detecting multiple working order indicators at one level, a quantity of a new order would be set to a sum of the quantities of the working orders. A trader could also delete all working orders by selecting and dragging the center column to a predefined location on the graphical user interface, which could invoke a "Cancel All" confirmation window, not shown. Alternatively, different user selection inputs could also trigger cancellation of all working orders. For example, a user could select "Cancel All Orders" tab 528 to cancel all working orders.

It should be understood that the indicators displayed in relation to the value axis, as well as the range corresponding to the value axis, may be automatically updated based on the changing market conditions. Additionally, the indicators shown in FIG. 5 are only examples, and more or fewer indicators based on the user's preferences could be displayed in relation to the interface 500 as well. Also, the format of the indicators as well as the position of each column in the interface 500 could be user-configurable to match each trader's trading style. It should be understood that different means could be used to modify the layout of information on the interface 500. According to one example embodiment, a trader could, for example, drag the bid column 502B directly next to the ask column 502A. Alternatively, additional interfaces could be provided to assist a user with changing the overall layout of the interface, such as changing the display from the column-based display of information to displaying the information, such as prices, in a row format.

Figure 6:
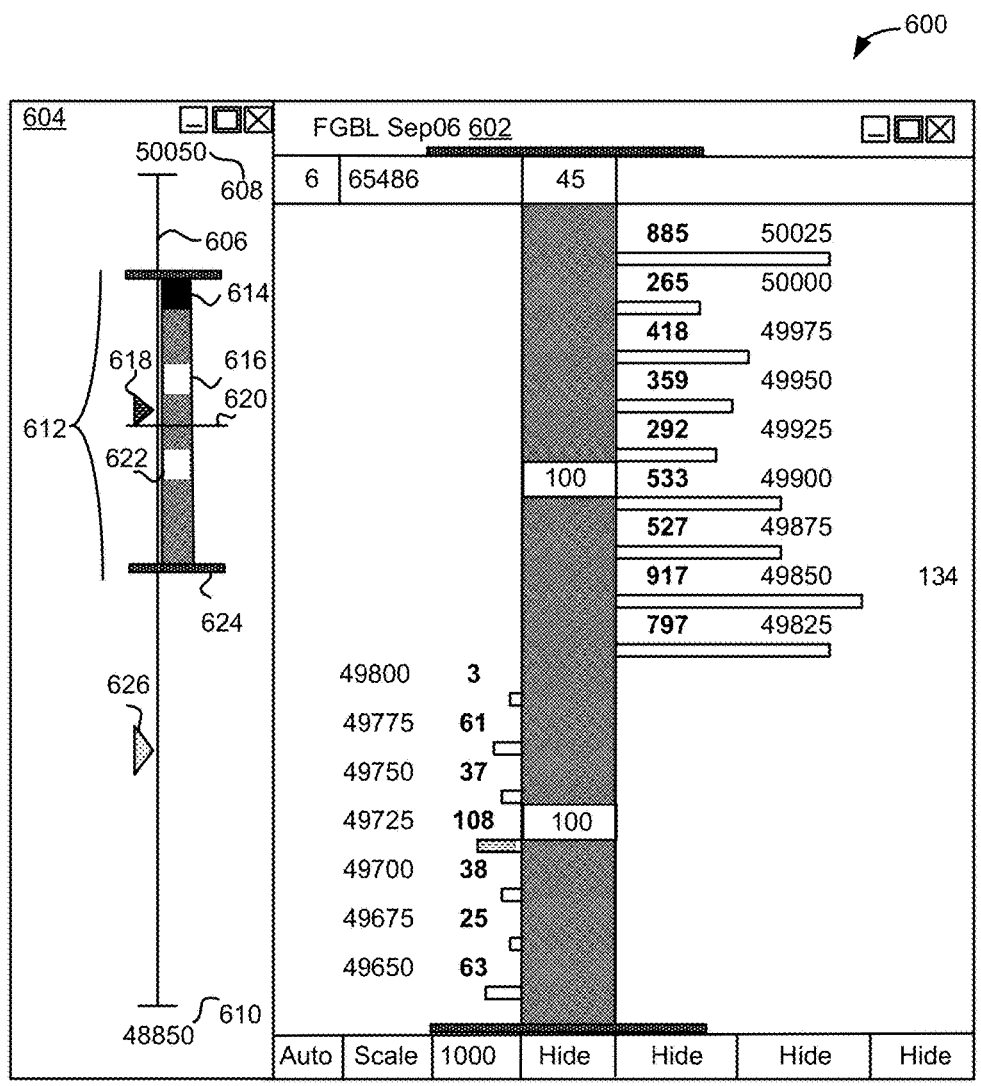
FIG. 6 is a block diagram illustrating another example interface that includes a combination of a depth interface and an overview interface.

FIG. 6 is a block diagram illustrating another interface 600 that includes a combination of a depth interface and an overview interface. The interface 600 includes a depth interface 602, the features of which were described in relation to FIG. 5, and an overview interface 604.

While the depth interface 602 provides a trader with a detailed view of market data and many user-defined indicators, the overview interface 604 provides an overview of the current market conditions compared to a larger, user-defined scale. Also, the overview interface 604 includes additional indicators related to the market data that are not provided in the depth interface 602 due to the scale limitations. As shown in FIG. 6, data in the overview interface 604 is displayed along an axis 606 covering a price range between the highest traded price detected for the day, here "50050" as shown at 608, and the lowest traded price detected for the day, here "48850," as shown at 610. While, in this example embodiment, the high and low traded prices of the day determine a range being used for the axis 606, it should be understood that different parameters could also be used as reference points based on user configuration.

It should be understood that a user could change a price scale that is used in relation to the overview interface 604. Such functionality may be especially useful when the price range between the high and low prices is too wide thus making it difficult to use the information displayed in relation to the overview gauge interface. According to one example embodiment, a user could have an option to set a compressed scale or to show the scale in a segment format. Additionally, prices above or below the highest and lowest traded prices could be displayed as well depending on the user's preferences. A user could also include or remove actual price value markers from the overview display. It should be understood that a user could achieve the desired view of the displays through configuration settings which could be manually set by the user or could be based on logical expressions created by the user or the system automatically.

According to one example embodiment, a number of market related indicators corresponding to the selected tradeable object could be displayed in relation to the value axis 606. In the example shown in FIG. 6, the indicators include a market depth indicator 612. The market depth indicator 612 displays a range of the current market depth, with the indicator 612 scaled and located based on the range of values that is used for the value axis 606. As illustrated in FIG. 6, the market depth indicator 612 is a scaled version of information displayed in relation to the interface 602. Using the interface shown in FIG. 6, a trader can quickly compare the current location of the market depth compared to the highest and lowest traded prices, or yet some other reference points specified by a user. It should be understood that the range of the indicator 612 may depend on a number of price levels displayed in the depth interface 602. Alternatively, when the overview interface 604 is used separate from the depth interface 602, the range of the indicator 612 could depend based on a host exchange providing market depth, since some exchanges provide market depth for all or many price levels, while others limit the number of market depth levels to only a few price levels.

It should be understood that the overview gauge 604 could be used without the presence of the detailed market depth gauge 602. For example, the overview gauge 604 could be displayed along other overview gauge interfaces. In such an embodiment, specific content information relevant to the tradeable object may be automatically transferred to the upper portion of the overview gauge 604, or yet some other location selected by a user, for the purpose of identifying the tradeable object represented by the overview gauge 604. The transferred data may include the name of the tradeable object or some other identifiers, as well as other information.

The market depth indicator 612 includes a number of indicators that were described in FIG. 5. More specifically, the market depth indicator 612 includes a net position indicator 614 that can be color-coded to show if a trader's net position is long or short (positive or negative with respect to the current market conditions), two working order indicators 616 and 622, a last traded price indicator 618, a current inside market level indicator 620, and a scale indicator 624 that corresponds to the lowest price level shown in the market depth gauge interface 602 shown to the right of the market overview gauge interface 604. Additionally, the overview interface 604 displays an open price indicator 626 that was not shown in the depth interface 602. It should be understood that more or fewer indicators could be displayed as well in relation to the information interface based on user-defined settings.

It should be understood that, similarly to the market depth gauge interface 602, the market overview gauge interface 604 could be used for order entry as well. As described in greater detail below, either click based order entry, an order ticket based order entry, or the combination thereof could be used to enter orders via the overview gauge interface 604. Also, a user could modify order parameters corresponding to working orders using the working order indicators 616 and 622. For example, a selection of one of the working order indicator using a predetermined key selection input and then clicking on the indicator may automatically cancel a working order. Alternatively, a user could move the displayed working order indicator to a new price level to effectively change an order price corresponding to the working order. It should be understood that, according to one example embodiment, the movement of the indicator to a new price level could activate an order ticket that could display the new price and allow a trader to change it before making any changes to the order.

According to one example embodiment, a trader can change the view of market depth displayed in the depth interface 602 by changing position of the depth indicator 612 in relation to the value axis 606. More specifically, moving the depth indicator 612 in relation to the axis 606 such that the depth indicator 612 covers a new range of prices on the axis 606 could effectively reposition the market data displayed in the depth interface 602. Upon repositioning of the depth indicator 612, a new set of prices and corresponding market data could be displayed in the market depth gauge interface 602. For example, if a trader leaves a trading desk and then notices that the inside market indicator 620 is positioned outside of the prices covered with the depth indicator, the trader can quickly move the depth indicator to a new set of price levels thus effectively changing the view of market depth in the interface 602 to now display the current market conditions including the current inside market. According to another example embodiment, the depth indicator 612 could be automatically repositioned to cover the inside market and thus reflect prices closest to the inside market.

Additionally the market view displayed in relation to the market depth gauge interface 602 and the market overview gauge interface 604 could be repositioned or re-centered using either manual or automatic repositioning commands. A manual repositioning command could take many different formats, such as clicking on a preset location of the market depth or overview interface, selecting a preset key on a keyboard, an audio command, or the combination thereof. It should be understood that different manual commands could be used as well. Then, an automatic repositioning command could be triggered based on many different criteria. For example, an automatic repositioning command could be triggered upon detecting that an inside market is displayed a preset number of ticks away from the upper or lower edge of either interface 602 or 604.

As mentioned earlier in relation to FIG. 5, a trader could control the amount of information displayed in a depth interface. FIGS. 7A-7E illustrate a few examples of market depth interfaces with progressively less data displayed in the interface based on user-defined settings.

Figures 7A, 7B:
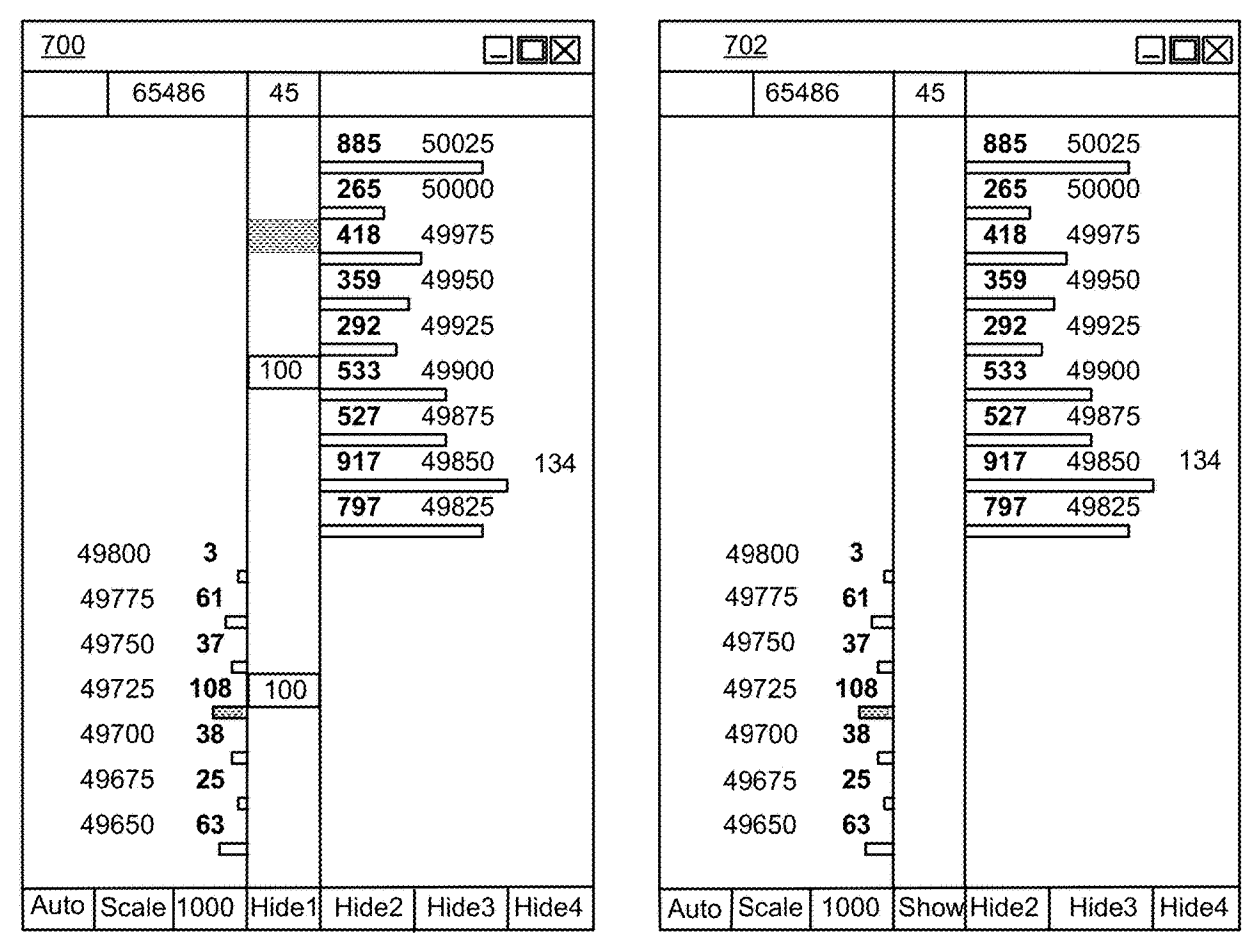

FIG. 7A is a block diagram illustrating a depth interface 700. The depth interface 700 displays indicators as well as market data that were described in relation to FIG. 5. Similarly to the interface in FIG. 5, the bottom of the interface 700 includes a number of selection icons that allow a trader to control the amount of data displayed in the interface 700, here "Hide-1-Hide-4." While, FIG. 7A illustrates Hide buttons with respect to columns on the ask side of the market, it should be understood that Hide buttons could be displayed with respect to columns that display bid related market data. In the embodiment shown in FIG. 7A and as will be described in greater detail below, selection of a Hide button corresponding to a column on the ask side of the market will be linked to the related information and a column on the bid side of the market. For example, selection of "Hide 2" that corresponds to the ask quantity column will result in removal of the ask quantity indicators and the quantity indicators on the bid side of the market. As mentioned earlier, separate Hide buttons could be used with respect to each quantity indicator column. Alternatively, when a "Hide" icon is selected, rather than blanking out any numerical or graphical indicators in the corresponding columns, the selection could result in hiding the columns entirely.

FIG. 7B illustrates a view of the depth interface 702 upon selection of the first hide icon, "Hide-1." According to one example embodiment, and as shown in FIG. 7B, the selection of the "Hide-1" icon results in removal of the target price indicator, as well as the working order indicators from the column corresponding to the "Hide-1" icon. Also, as shown in FIG. 7B, the "Hide-1" button was replaced with a "Show-1" icon that allows a trader to dynamically re-activate the previous view of the interface in relation to the central column.

Figure 7C:
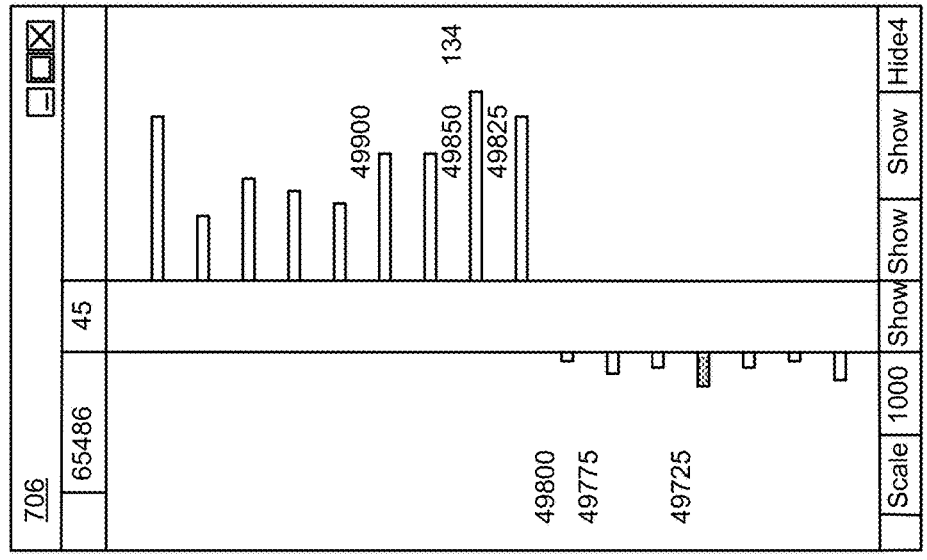

FIG. 7C shows another view of a market depth interface 704, with both, "Hide-1" and "Hide-2" selection icons activated. According to one example embodiment, the activation of the "Hide-2" icon results in the removal of numeric quantity values at a plurality of price levels being used in relation to the interface. As shown in FIG. 7C, activation of the "Hide-2" icon causes removal of the quantity indicators on both sides of the market, the bid side and the ask side.

Figure 7D:
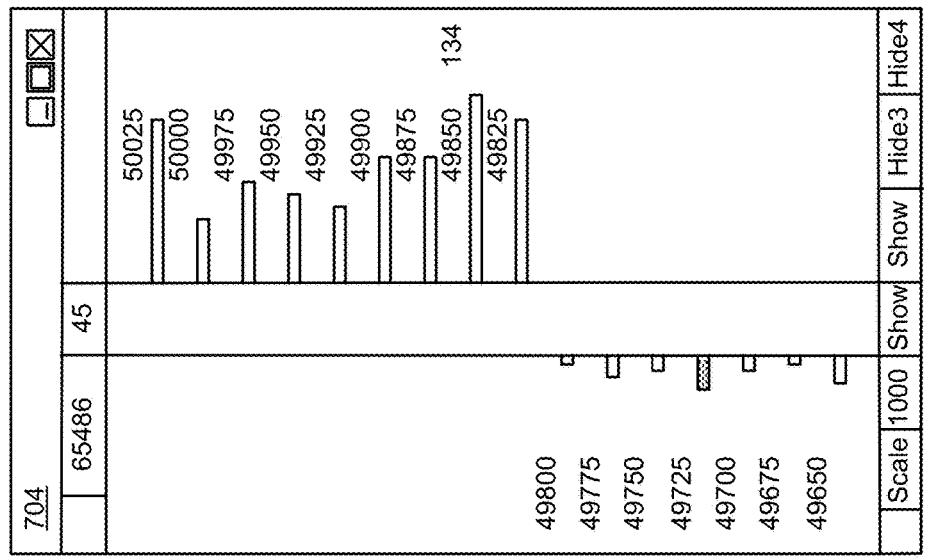

FIG. 7D shows a subsequent view of a market depth interface 706, with three, "Hide-1," "Hide-2," and "Hide-3," icons activated. As shown in relation to the market depth interface 706, the activation of the "Hide-3" icon results in removal of all numeric price levels on both bid and ask sides of the market, except for user-defined levels. In the shown embodiment, the user-defined levels correspond to the inside market prices, one price level closest to the inside market, as well as prices corresponding to trader's working orders. It should be understood that alternative embodiments are possible as well.

Figure 7E:
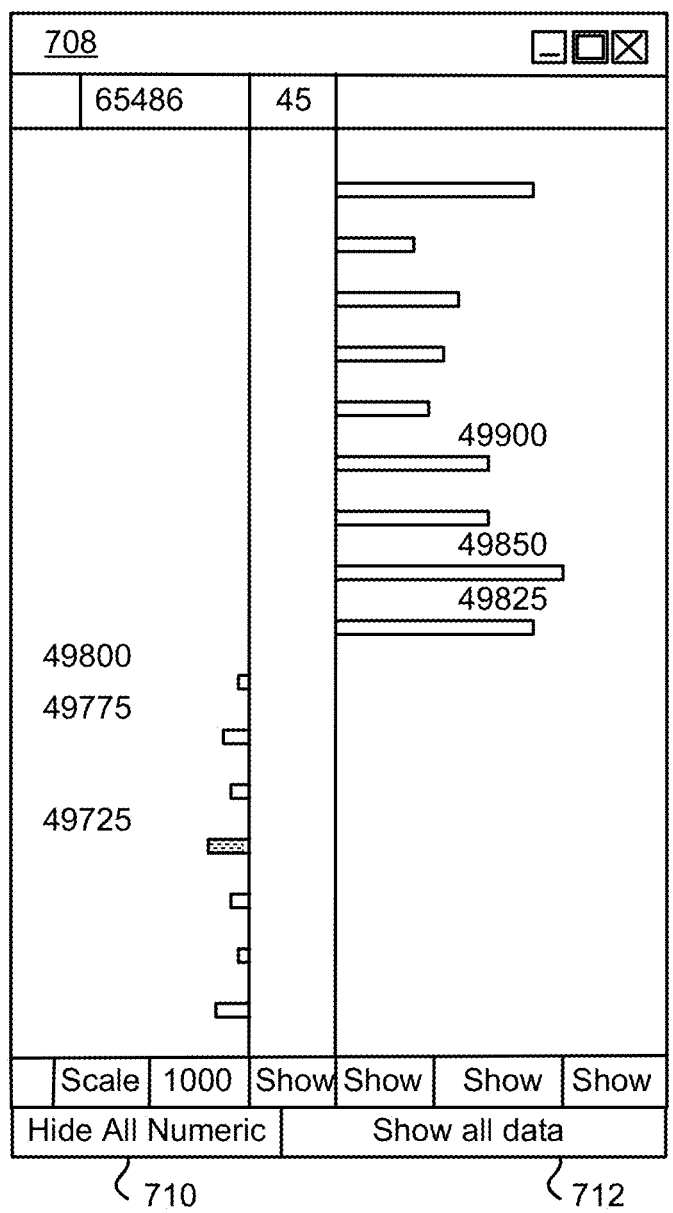

FIG. 7E shows another view of a market depth interface 708, with all four "Hide" icons activated. Upon selection of the "Hide-4" icon via the interface 706 is FIG. 7D, the last traded price indicator is no longer displayed, as shown in FIG. 7E. According to yet another example embodiment, a "Hide-All Numeric" icon 710 could also be provided with the interfaces described above to enable a user eliminate all numeric data from the interface. In such an embodiment, the horizontal bars could remain displayed to show the quantity at a plurality of price levels. While not shown in the previous figures, it should be understood that the "Hide All Numeric" icon 710 could be displayed in other interfaces as well, depending on the user's configuration settings. Also, as shown in FIG. 7E, a user restore the default display by selecting "Show All Data" icon 712. Similarly to the "Hide All Numeric" icon 710, the icon 712 could be displayed in relation to interfaces 700-706.

While the amount of information displayed in the described depth interfaces is controlled using the hide and show buttons, it should be understood that different means for controlling the amount of displayed information could be used as well, including but not limited to logic driven systems that are either user or algorithm determined, or the combination thereof. Additionally, a secondary set of controls could be provided to rearrange or remove/reestablish columns upon removal/display of data in relation to each column. For example, upon selection of the "Hide-1" icon another "Hide Column" icon could be displayed in relation to the "Show" icon so that, upon detecting a selection of the "Hide Column," the center column could be removed, and other market data could be repositioned towards the center of the interface. Also, as mentioned earlier, a trader could drag and drop columns to different locations to match different traders' trading styles.

B. Order Parameter Change Interface

Changing order parameters of pending orders via many existing interfaces may be time consuming. According to one common interface, a trader has to open an order window to view pending working orders. Then, to change any order's parameters, a trader is required to select an order, and then use another interface to change order parameters of the selected order, or yet perform some other order related actions. The problem further increases when a trader has many working orders associated with multiple tradeable objects, and while the orders are pending at more than one electronic exchange. Also, if a trader has multiple orders working at the same price level, the trader often needs to spend time searching for a working order that the trader wishes to modify. The example embodiments for changing order parameters will be described in relation to the interfaces described earlier. However, it should be understood that the functionality described below can be used in combination with any other interfaces as well.

Figure 8A:
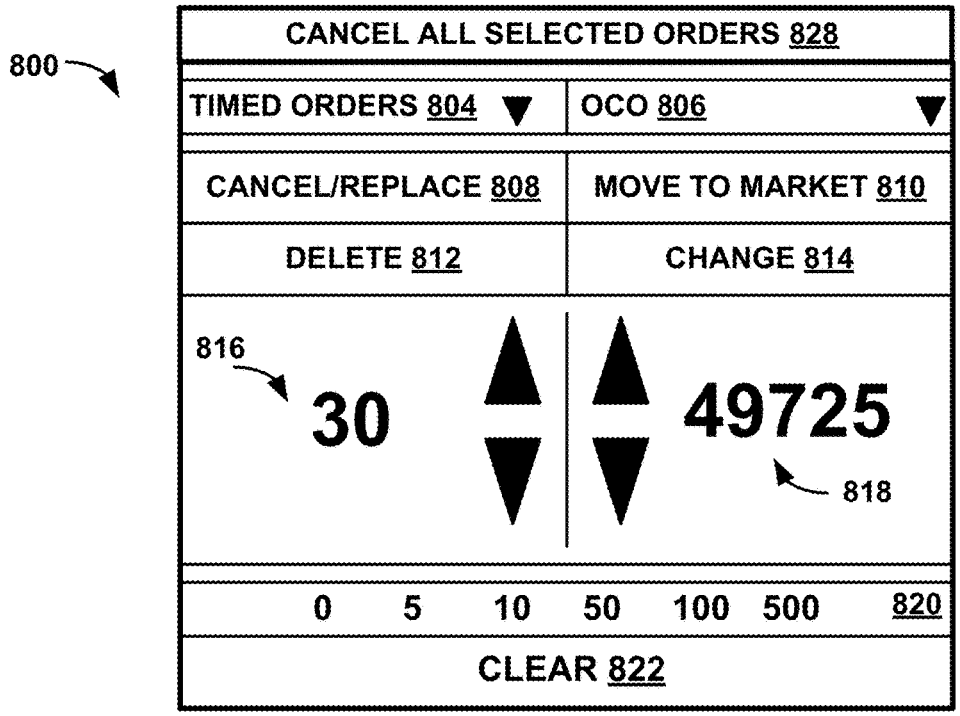
FIGS. 8A and 8B illustrate a change order interface and an open order interface that can be used by a trader to change order parameters as well as perform many other order related actions.
Figure 8B:
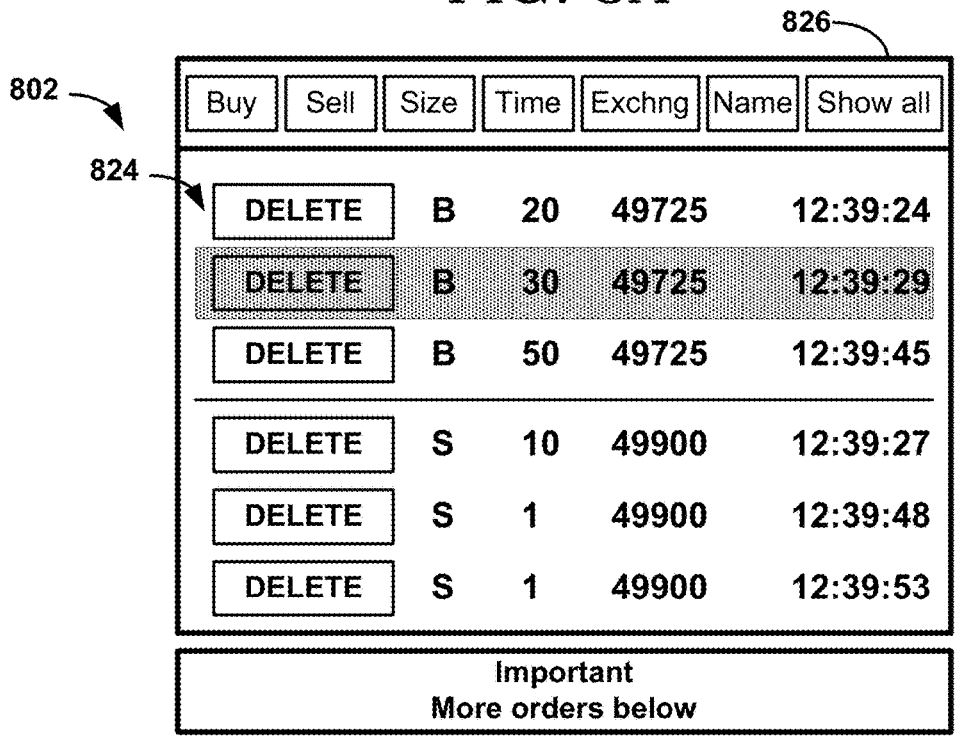

FIGS. 8A and 8B illustrate two example embodiments, a change order interface 800 and an open order interface 802 that can be used by a trader to change order parameters as well as perform many other order related actions.

According to one example embodiment, the interfaces 800 and 802 can be automatically activated upon detecting a selection of a working order indicator in the previously described overview gauge and depth gauge interfaces. Referring back to FIG. 5, it will be assumed that a trader selected the working order indicator 508 on the bid side of the market. Upon detecting a selection of a working order indicator, the interface 802 may automatically create a complete list of working orders that are pending at the selected price level, with the selected orders shown at the top of the interface, here three buy orders sorted based on the time when each order was submitted to an electronic exchange. It should be understood that the format of displaying the working orders shown in FIG. 8A is only an example, and many additional display formats could be used as well. According to one example embodiment, a user could, through the user of preferred functions, configure alternate default order display formats. Additionally, depending on the exchange, certain selection icons displayed in relation to the interface 800 could be displayed based on functionality provided by an exchange to which a trade order is being submitted or a change in an order parameter is being made. For example, if a "cancel/replace" request is not being supported by an exchange, the icon could be disabled. Alternatively, only selection icons corresponding to functions available at an exchange could be provided as well.

Additionally, as shown in FIG. 8B, the interface 802 could display detailed information corresponding to working orders that were not specifically selected by a trader. If there are additional working orders that are not displayed due to the space constraints of the interface, the interface could display a message informing a trader of such conditions, such as shown at the bottom of the interface 802. Also, it should be understood that a user could resize the interface using standard graphical user interface manipulation methods to either view more or fewer orders in the open order entry window. However, it should be understood that, based on a trader's preferences, the interface 802 could only display working orders associated with the selected price or other orders for the tradeable object displayed in the overview and depth gauge interfaces. Additionally, based on the selection of additional order display buttons shown on the top of the working order display interface at 826, a user could quickly enable the display of orders based on other sorting and display criteria. As shown in FIG. 8B, the sorting criteria could include "Buy" orders, "Sell" orders, "Size," "Time," "Exchange," "Name," or yet some other criteria, such as an order type, priority, and many additional factors/parameters.

According to one example embodiment, a trader can use the interface 802 to select an order to be modified, here, the second order from the top, corresponding to the quantity of 30, as shown in gray background in FIG. 8B. Upon the selection of a desired order, the change order interface 800 can be automatically populated with order parameters corresponding to the selected order. The change order interface 804 can be used to change order parameters. As shown in FIG. 8A, the interface 804 includes a number of icons that here correspond to a "Timed Orders" icon 804 and "OCO" icons 806. Upon selection of the icon 804, a trader can convert the currently selected order into a timed order. Similarly, the icon 806 may allow a trader to create and select desired trading strategies, such as, for example, order cancel order ("OCO"), shown here.

According to one example embodiment, when an order is selected via the interface 802, a working order indicator corresponding to the selected order displayed via the depth gauge interface and/or the overview interface could be highlighted or yet some other indicators could be used to visually differentiate the order from other working orders. In such an embodiment, if a user wishes to modify a price of the selected order, the user could do so by dragging the order indicator to a new price level in the depth gauge or overview interface.

Using the change order interface 800, a trader could change the quantity of the selected order displayed in a field 816, here the quantity of 30, by selecting one of the arrows displayed in that field. The upper arrow could be used to increase the order quantity by a preset value, and the bottom arrow could be used to decrease the order quantity by the same or different preset value. Similarly, a trader could change the order's price displayed in a field 818 by selecting either of the arrows displayed to the left of the price, here the price of 49725 corresponding to the selected order. It should be understood that a trader could also select the values in the fields 816 and 818 and manually key in desired values. Further, alternatively, a trader could change a quantity in the field 816 by selecting one of the values at 820.

Once the order parameters are modified, a trader can select a "Change" icon 814 to send a change request for the selected order to an electronic exchange. Alternatively, a "Clear" icon 822 can be used to clear all parameters displayed in the interface 800. Further, a "Cancel/Replace" icon 808 allows a trader to cancel the selected order and replace it with a new order having the new parameters. A "Move to Market" icon 810 could be used to move the selected order to a price that is closer to the current inside market, such as, based on the user's configuration, a price at the inside market or a price a few price levels away from the current inside market. Then, a "Delete" icon 812 allows a trader to delete the selected order. In addition to using the interface 800, a trader could also delete any order displayed in the open order interface 802 by selecting a "Delete" icon displayed next to each working order.

According to another example embodiment, a user could select multiple orders displayed via the interface 802 using standard or multiple custom selection methods, such as Ctrl/Click or some other methods that would allow for the selection and modification of multiple orders. In such an embodiment, actions taken by a trader on the selected orders through the use of the change order interface could be applied to all selected orders. An additional functional control, "Cancel all selected orders" 828 is provided to allow a user cancel all selected orders using a single selection button.

While not shown, a scan column, similar to that shown in FIG. 3, could be used in relation to the order book shown in FIG. 8B. According to one example embodiment, a scan column could be displayed in the interface 802. Alternatively, the functionality of the scan column could be built into one of the existing columns, such as the column that displays prices of each order. Using the scan column or the scan column functionality described above, the order information displayed in the change order interface 800 could dynamically change based on the position of the cursor in the scan column or some other column assigned the scan column functionality so that the order information displayed in the interface 800 corresponds to the selected order.

Figure 9:
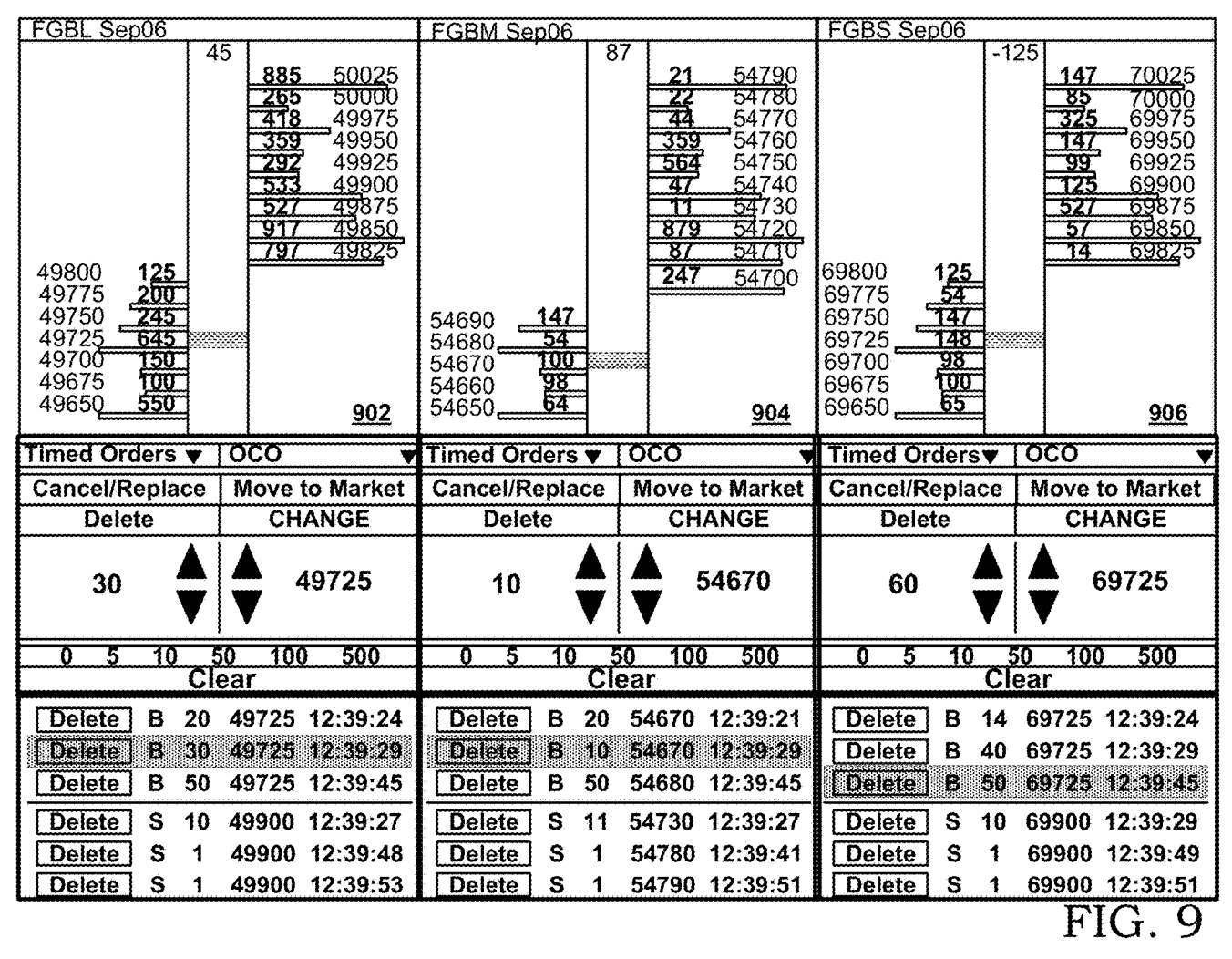

Once activated, the interfaces 800 and 802 could be displayed in relation to a depth interface displaying the selected working order indicator, and the position of the interfaces could be changed by a user based on the user's preferences. FIG. 9 is a block diagram illustrating a plurality of depth interfaces 902, 904, and 906 with accompanying change order and open order interfaces. Using such a combination, a trader can view changing market conditions and quickly change order parameters of desired orders.

As explained earlier, when a trader selects a working order indicator in one of the depth windows 902-906, the corresponding open order interface will be populated with information corresponding to the selected order. It should be understood that more than one working order indicator could be simultaneously selected as well. For example, selection of any point in the center column between the working order indicators may cause automatic display of all working orders in an open order interface corresponding to the depth interface in which the selection was made.

Also, as mentioned earlier, a trader can move a working order indicator to a new price level. In such an embodiment, a change order interface could reflect the price changes for the order, and a trader could confirm a desired price in the change order interface before any changes are made to the existing order. However, it should be understood that, through the setting of user preferences, this action can take place without a display of a verification screen or related elements. Similarly, when a trader moves two or more working order indicators to the same price level to consolidate the orders, a change order interface could also reflect the consolidated quantity as well as the price at which the orders are placed. A trader could then confirm the desired action before any changes are made to the orders. Additionally, the corresponding open order interface could display all selected working orders upon selecting the "Show all" button described above. It should be understood that FIG. 9 illustrates a simplified view of the change order and open order interfaces and additional icons shown in relation to FIG. 8 could be displayed as well, such the icons shown at 826, 828, and other icons described above.

C. Configurable Order Entry and Order Change Interfaces

While many traders enter their orders through their trading interfaces, some traders still use order entry windows, often referred to as "order entry tickets." While traders can configure individual settings within an order entry ticket, such as a default price or quantity, they have no control related to the overall physical layout of the major components of the order entry ticket. This means that traders are forced to interact with a standardized order entry ticket having major components not optimized for the trader's individual needs or style. More specifically, traders have no control over the layout of the elements, size of selection icons, and other physical and layout arrangement issues that often influence the speed and accuracy of order entry and other functions. The same limitations are often encountered with order change interfaces.

The interfaces described below specifically address the needs of traders in the task of order entry and order change by creating a drag and drop style system that a trader can use to interactively create and modify physical layout of order entry tickets and order change interfaces. Such a system allows a trader to create highly customized configurations that are more closely aligned with the trader's individual trading style, which may result in faster and more accurate trade execution.

Figure 10:
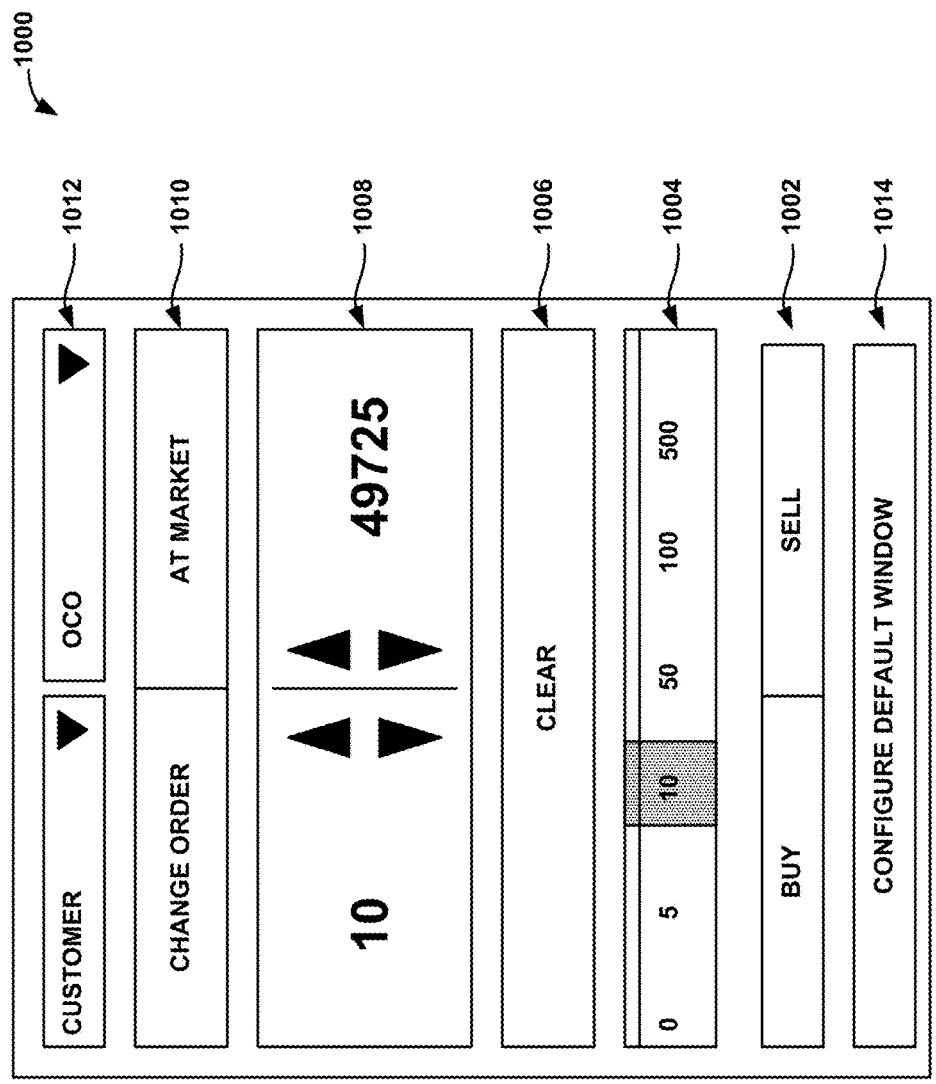
FIG. 10 is a block diagram illustrating an example set of modules that can be used by a trader to create a desired order entry ticket and/or order change interface.

According to one example embodiment, a trader can build a customized interface using a number of preconfigured modules. FIG. 10 is a block diagram illustrating an example set of modules 1000 that can be used by a trader to create a desired order entry ticket and/or order change interface. While FIG. 10 will illustrate a number of particular modules, it should be understood that elements within each module could be selectable as independent modules as well.

The modules in FIG. 10 include "Module 1" 1002 with buy and sell buttons, "Module 2" 1004 with default and selectable quantity buttons, "Module 3" 1006 with a clear button, "Module 4" 1008 with price and quantity fields and spinners, "Module 5" 1010 with market button and a change order button, and "Module 6" 1012 with drop down menu lists for details.

Figure 11:
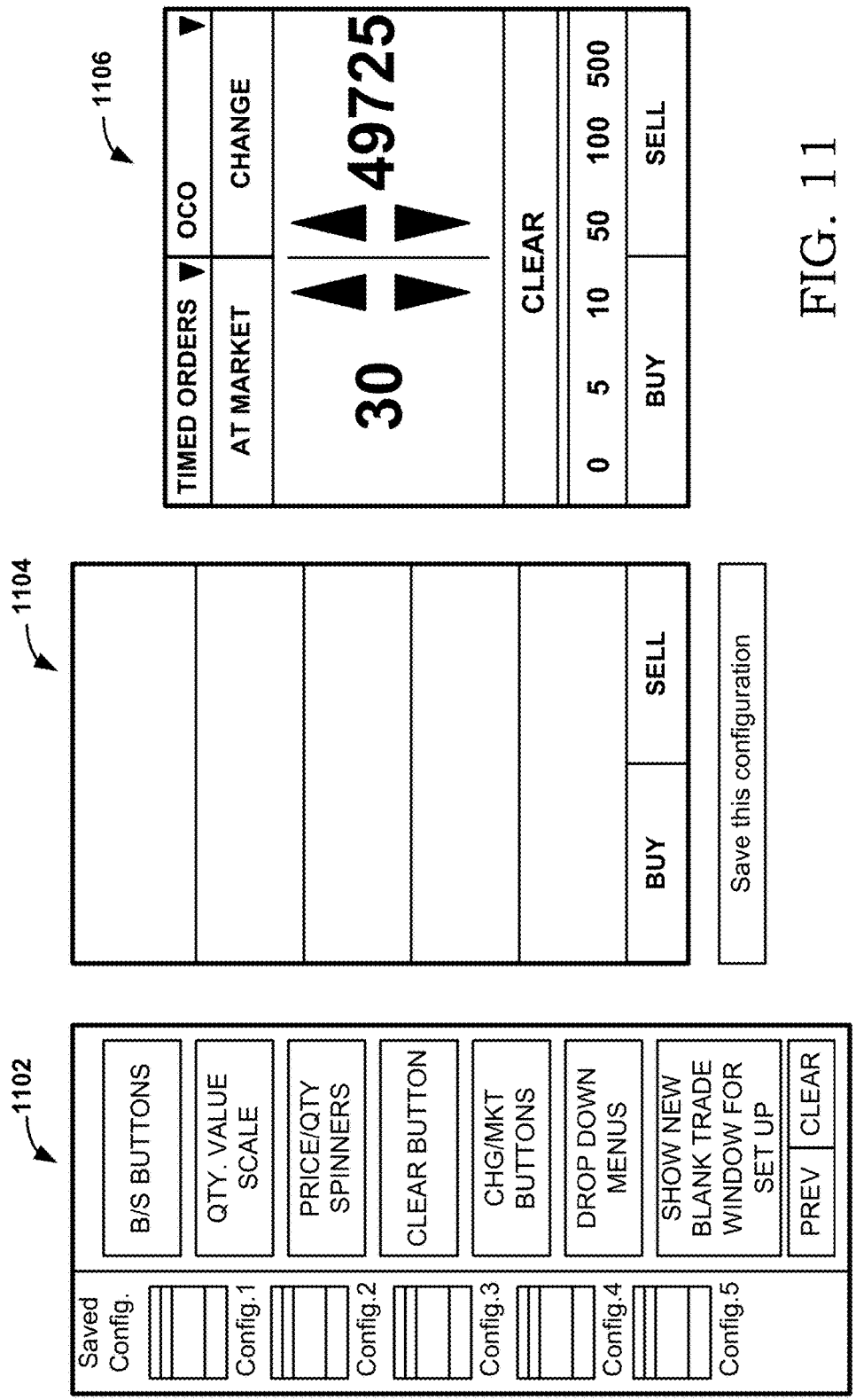
FIG. 11 is a block diagram illustrating an example configuration interface that a user can use to create a desired order entry/change tickets.

According to one example embodiment, to build an interface of a desired configuration, a trader can first activate a default configuration window by selecting a "Configure default window" selection icon 1014. FIG. 11 is a block diagram illustrating an example default configuration interface. More specifically, FIG. 11 includes a selection interface 1102, a default configuration interface 1104, and an example order entry/order change interface 1106. The selection interface 1102 includes a number of modules that can be used by a trader to create a desired interface, such as "B/buttons," "Qty. value scale," and others, all of which were described in greater detail in relation to FIG. 10. The selection interface 1102 also includes a number of pre-defined order entry layouts, illustrated as "Config. 1"-"Config. 5," which a trader can select to automatically populate the default configuration interface 1104.

If a trader does not select any preconfigured interfaces, the trader can compose the default configuration interface 1104 by dragging modules from the selection interface 1102 to a desired location in the default configuration interface 1104. In FIG. 11, the Buy/Sell buttons are displayed in the default configuration interface 1104 upon a trader selecting the "B/buttons" module in the interface 1102 and dragging it to the bottom of the interface 1104, as shown with an action line 1108. According to the embodiment illustrated in FIG. 11, a trader can select desired modules from the interface 1102 and drag them to the interface 1104 in a desired vertical stacking order. The interface 1104 shows six vertical levels that a trader can use as locations for the desired modules. However, it should be understood that fewer or more levels could be used, and the location as well as the width of each level could be user-configurable. Also, once the modules are positioned in the interface 1104, a trader can reposition them within the interface using the drag and drop functionality as well. Interface 1106 shows an example layout of the order entry/order change interface upon completion of the process.

Figure 12:
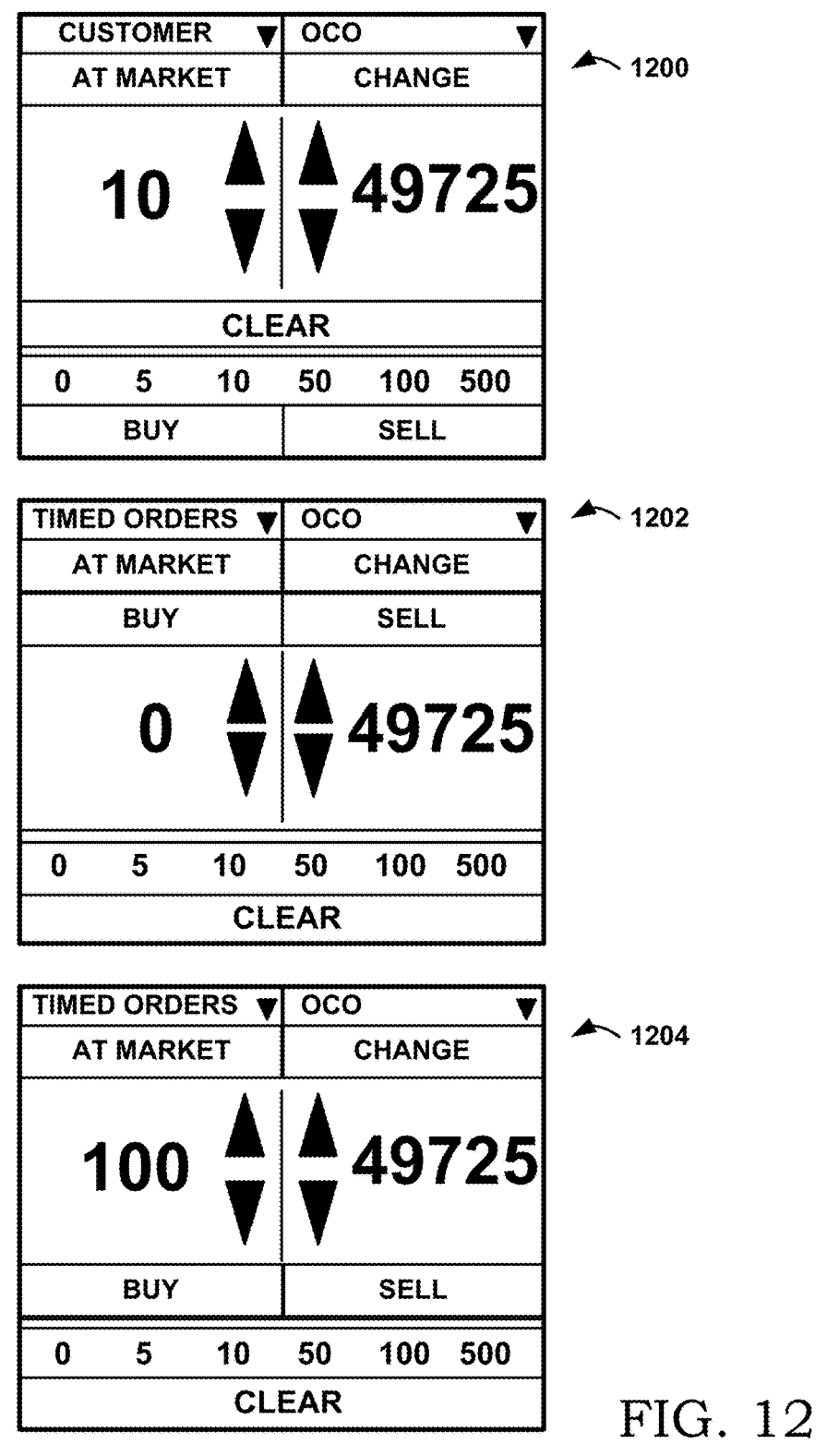

FIG. 12 is a block diagram illustrating a plurality of order entry tickets 1200, 1202, and 1204 having different layouts. While the selection icons in each interface match in size, it should be understood that a trader could change sizes of certain selection icons. For example, certain icons that are used more frequently than others could be bigger than those used less frequently.

Figure 13:
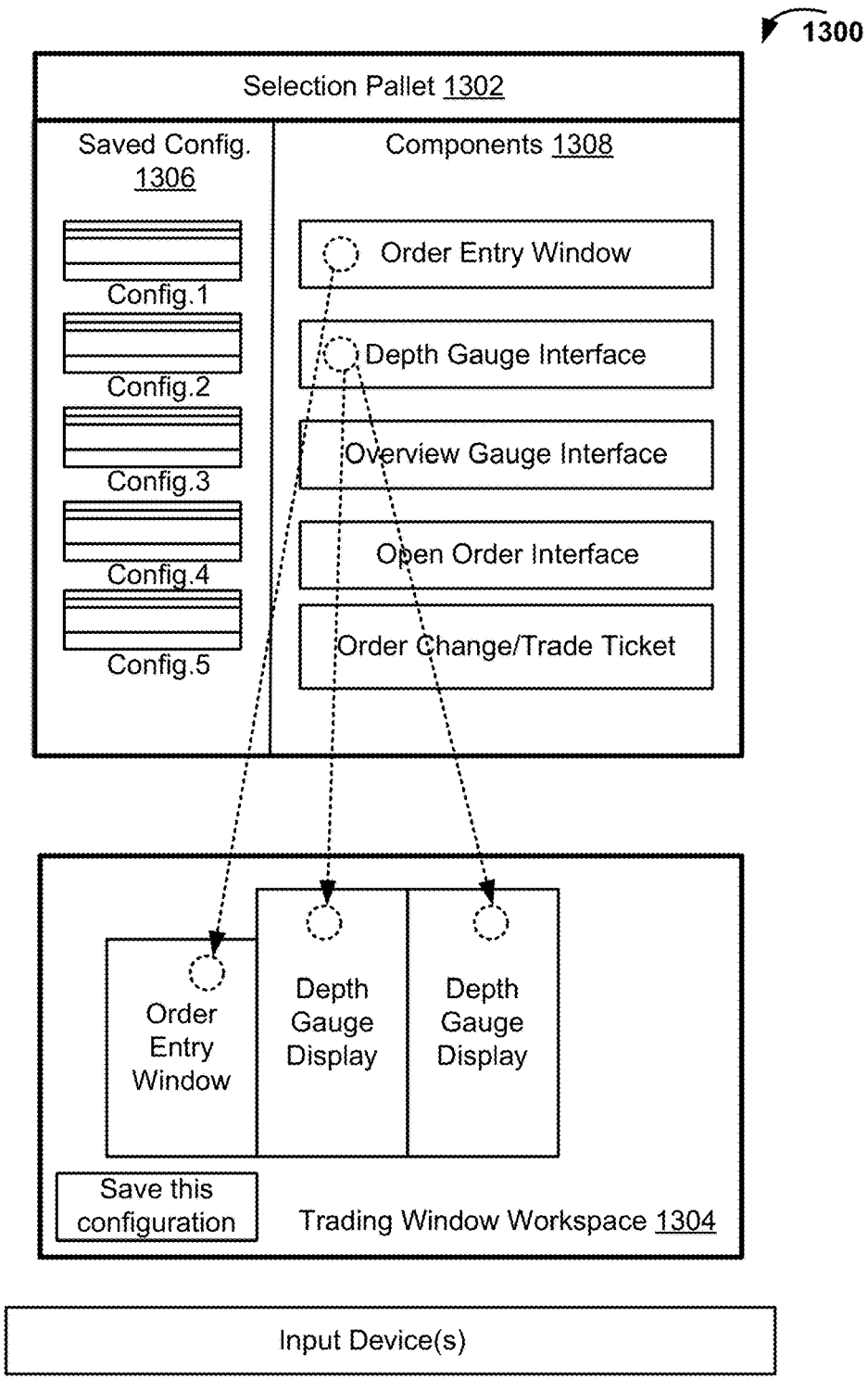
FIG. 13 is a block diagram illustrating a configuration interface for creating trading workspaces.

While FIGS. 11 and 12 described different methods for configuration of the order entry tickets, similar methods could be applied to create user trading workspaces. FIG. 13 is a block diagram 1300 illustrating a method that can be used to create a trading window workspace. To build a trading window workspace, a trader can drag and drop components from a selection pallet interface 1302 or quickly select one of the saved trading window workspaces, such as "Config. 1" and "Config. 2," shown in the "saved configurations" portion 1306 of the selection pallet 1302. To build a new workspace, a user can simply select a new configuration window workspace by selecting a "New Config" icon displayed along with the saved configurations. Then, upon creating a new trading window workspace, a user can drag and drop different workspace components from a component section 1308 of the selection pallet 1302. The workspace components illustrated in section 1308 correspond to the interfaces described in detail above, and include from top to bottom, an order entry interface, a depth gauge interface, an overview gauge interface, an open order interface, and an order change/trade ticket interface. To place a desired component in the trading window workspace, a trader can select it via the component window 1308 and drag it to the trading window workspace 1304, such as shown with respect to the order entry window and the depth gauge display illustrated in the trading window workspace 1304. Once positioned in the trading window workspace, the workspace components can be moved to desired locations using the same drag and drop functionality. The newly created workspace can be saved by selecting a "Save this configuration" button.

It will be apparent to those of ordinary skill in the art that methods involved in the system and methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. An electronic trading device comprising:
a market data receiver configured to receive market information for a plurality of tradeable objects from at least one electronic exchange;
a user input device;
an electronic display coupled with the user input device;
an electronic processor coupled with the market data receiver, the electronic display and the user input device, where the electronic processor is configured to generate on a graphical user interface on the electronic display for displaying the market information to a user and to receiving an input from the user while the user interacts with the displayed market information, where the graphical user interface includes:
a market view interface for a tradeable object, the market view interface displaying at least one parameter of a plurality of parameters and a corresponding scan area for each tradeable object of the plurality of tradeable objects, the scan area configured to receive a user input to select the tradeable object corresponding to the scan area, and
a depth gauge interface relative to the market view interface, the depth gauge presenting the market information for a selected tradeable object, where the selected tradeable object is determined in response to receiving a first user input relative to a selected scan area of the market view interface corresponding to the selected tradeable object, the market information for the tradeable object being presented along a value axis for the selected tradeable object, the value axis including an area for displaying at least a bid quantity indicator for a highest bid price for the selected tradeable object relative to the value axis and an area for displaying an ask quantity indicator for a lowest ask price for the selected tradeable object relative to the value axis; and
an order router coupled with the electronic processor and configured to submit an order for the selected tradeable object in response to receiving a second user input received relative to the value axis in the depth gauge interface, the order for the selected tradeable object having order parameters for the order corresponding to the tradeable object.

2. The electronic trading device of claim 1 where the plurality of parameters includes tradeable object name, working buys, bid quantity, bid price, ask price, ask quantity, working sells, net position, last traded price, and last traded quantity.

3. The electronic trading device of claim 1 where a number of the plurality of tradeable objects displayed is user-selectable.

4. The electronic trading device of claim 1 where a number of parameters is user-selectable.

5. The electronic trading device of claim 1 where receiving the first user input comprises detecting a predefined movement of an indicator according to a user input device.

6. The electronic trading device of claim 5 where the predefined movement comprises at least any one of directional movement, speed of movement, an amount of time the indicator hovers over the selected scan area, and combinations thereof.

7. The electronic trading device of claim 1 where the value axis comprises a price-based value axis.

8. The electronic trading device of claim 1 where the electronic processor is further configured to generate a plurality of depth gauge interfaces in response to receiving a plurality of user inputs relative to a plurality of selected scan areas for a plurality of selected tradeable objects.

9. The electronic trading device of claim 8 where each of the plurality of depth gauge interfaces has a value axis corresponding to one of a plurality of selected tradeable objects.

10. The electronic trading device of claim 1, where the electronic processor is further configured to automatically cycle through plurality of tradeable objects.

11. The electronic trading device of claim 10 where automatically cycling includes generating at least any one of the value axis, the bid quantity indicator, and the ask quantity indicator via the depth gauge interface for a corresponding one of the plurality of tradeable objects, where the plurality of tradeable objects are cycled according to a user defined variable.

12. The electronic trading device of claim 11 where the user defined variable comprises any one of a user-defined time period, market activity, market volume, amount of market movement, relationship between market, and combinations thereof.

13. The electronic trading device of claim 10 where automatically cycling is configured to be activated according to a user selection.

* * * * *